United States Patent [19]

Oguri et al.

[11] Patent Number: 5,104,245
[45] Date of Patent: Apr. 14, 1992

[54] PRINTING APPARATUS WITH FORM EDITOR

[75] Inventors: Yasushi Oguri; Akihiko Yamamoto, both of Fussa, Japan

[73] Assignees: Casio Computer Co., Ltd.; Casio Electronics Manufacturing Co., Ltd., both of Tokyo, Japan

[21] Appl. No.: 458,445

[22] Filed: Dec. 28, 1989

[30] Foreign Application Priority Data

Jan. 13, 1989 [JP] Japan ................................. 1-6430

[51] Int. Cl.⁵ .............................................. B41J 5/30
[52] U.S. Cl. ....................................... 400/68; 400/76
[58] Field of Search .................... 400/17, 1, 22, 67, 68, 400/76

[56] References Cited

U.S. PATENT DOCUMENTS

| | | | |
|---|---|---|---|
| 4,450,453 | 5/1984 | Kitamura et al. | 346/108 |
| 4,826,333 | 5/1989 | Tanaka | 400/68 |
| 4,831,583 | 5/1989 | Pascoe | 400/76 |
| 4,943,936 | 7/1990 | Mirai | 400/68 |
| 4,944,614 | 7/1990 | Tanaka | 400/68 |
| 4,957,380 | 9/1991 | Gerstle | 400/76 |

FOREIGN PATENT DOCUMENTS

| | | | |
|---|---|---|---|
| 133638 | 8/1984 | Japan | 400/68 |
| 97885 | 5/1985 | Japan | 400/68 |
| 61-285556 | 12/1986 | Japan | 364/900 |
| 62-2336 | 1/1987 | Japan | 400/121 |
| 238757 | 10/1987 | Japan | 400/68 |

Primary Examiner—David A. Wiecking
Assistant Examiner—Steven S. Kelley
Attorney, Agent, or Firm—Nixon & Vanderhye

[57] ABSTRACT

A print image is stored in a frame memory. A CPU combines form data and non-form data and develops a resultant synthetic image in the frame memory, thereby obtaining the print image. The CPU sequentially develops only non-form data in a previously set area of the image memory after form data has been developed without erasing the developed form data until the form data is subjected to change. Thus, new print images are sequentially obtained by sequentialy developing new non-form data with the form data developed only once. A printer prints a print image stored in the image memory. The image of the form data developed in the image memory is held until an instruction is issued to change the form data.

10 Claims, 7 Drawing Sheets

LIST OF
TOTALIZATION

|  | COLUMN1 | COLUMN2 | COLUMN3 | COLUMN4 | COLUMN5 |
|---|---|---|---|---|---|
| ROW 1 |  |  |  |  |  |
| ROW 2 |  |  |  |  |  |
| ROW 3 |  |  |  |  |  |
| ROW 4 |  |  |  |  |  |
| ROW 5 |  |  |  |  |  |
| TOTAL |  |  |  |  |  |

LIST OF
TOTALIZATION

|  | COLUMN1 | COLUMN2 | COLUMN3 | COLUMN4 | COLUMN5 |
|---|---|---|---|---|---|
| ROW 1 | 12 | 34 | 56 | 78 | 90 |
| ROW 2 | 34 | 56 | 78 | 90 | 12 |
| ROW 3 | 56 | 78 | 90 | 12 | 34 |
| ROW 4 | 78 | 90 | 12 | 34 | 56 |
| ROW 5 | 90 | 12 | 34 | 56 | 78 |
| TOTAL | 270 | 270 | 270 | 270 | 270 |

FIG. 3C

|        | COLUMN1 | COLUMN2 | COLUMN3 | COLUMN4 |
|--------|---------|---------|---------|---------|
| ROW 1  | XXXX    | XXXX    | XXXX    | XXXX    |
| ROW 2  | XXXX    | XXXX    | XXXX    | XXXX    |
| ROW 3  | XXXX    | XXXX    | XXXX    | XXXX    |
| ROW 4  | XXXX    | XXXX    | XXXX    | XXXX    |
| TOTAL  | XXXX    | XXXX    | XXXX    | XXXX    |

LEFT END    SKIP    SKIP    SKIP    SKIP

PRINTING APPARATUS WITH FORM EDITOR

BACKGROUND OF THE INVENTION

1. Field of the Invention

The present invention relates to a printer and a printing method.

2. Description of the Related Art

In printing results of documentation, accounting and statistics, diagrams, lists and slips having frames formed with lines are widely used. Characters to be printed in the frames generally vary from page to page, but the frames will not vary. In printing such diagrams and lists, therefore, data of a fixed form (hereinafter referred to as form data) is stored in a memory for repeated use. A process is performed to synthesize the form data and data to be inserted into frames (hereinafter referred to as non-form data). The synthesizing process is called a form overlay process.

Figure 1:
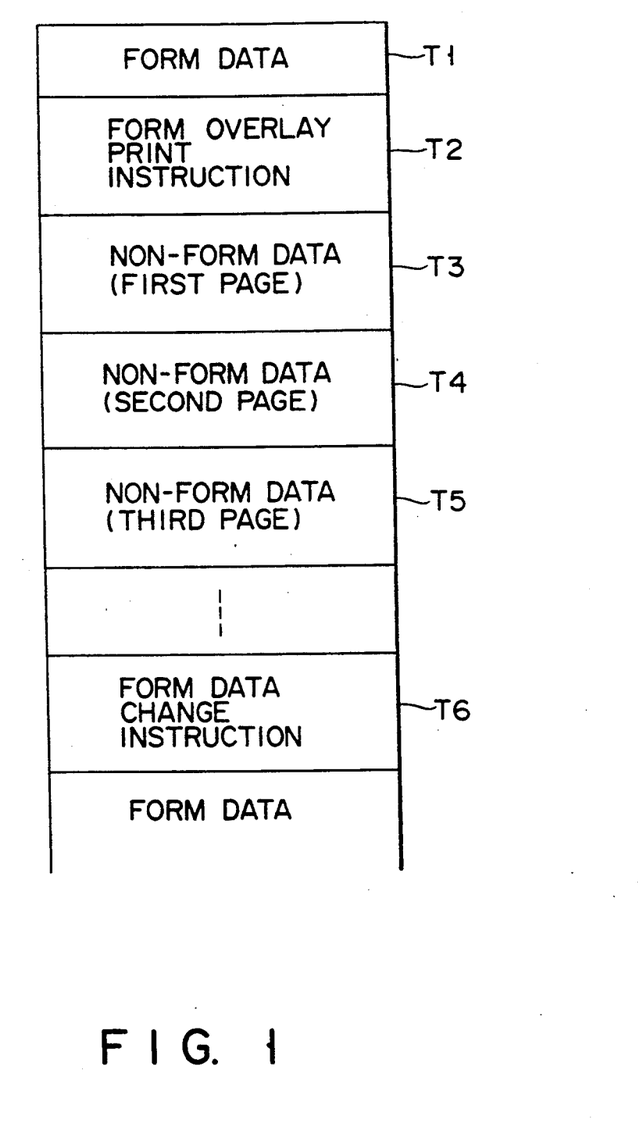
FIG. 1 illustrates data and instructions transmitted from a host computer to a printer.

A conventional form overlay process will be described taking a case where data shown in FIG. 1 is transmitted from a host computer by way of example. When supplied to a printer, form data T1 (code data) is stored in a form data memory in the printer. The form data is developed in a form data image memory. A form overlay print instruction is next supplied from the host computer to the printer. By this instruction the printer is set to a form overlay print mode. Subsequently the first page of the non-form data is supplied from the host computer to the printer. The non-form data is temporarily stored in a receiving buffer. The non-form data is read out of the receiving buffer to be developed in a non-form data image memory. Afterward bit map data recorded in the form data image memory are logical ORed with bit map data recorded in the non-form data image memory. The resulting bit map data are written into a frame memory. When a print image for one page is prepared in the frame memory, the image is printed on a sheet of paper. When printing of the first page is completed, the bit map image in the frame memory is cleared (erased).

When non-form data for the second page is applied to the printer, it is developed in the non-form data image memory. The contents of the form data image memory are logical ORed with the contents of the non-form data image memory. The results of logical ORing are stored in the frame memory. When the image data for one page is developed in the frame memory, printing operation is carried out. Upon the completion of printing, the contents of the frame memory are cleared. The above processes are subsequently repeated each time non-form data for the next page (the third page, fourth page, etc.) is supplied from the host computer.

With the conventional form overlay process, the non-form data and the form data are synthesized or combined and developed each time the non-form data is changed. Therefore, problems with the conventional printer are slow printing speed and low printing efficiency for images having frames. Moreover, two memories (or two areas) for bit map data are needed in addition to frame memories.

SUMMARY OF THE INVENTION

It is an object of the present invention to provide a printing apparatus and a printing method which can improve processing speed more economically.

According to an aspect of the present invention there is provided a printer comprising: receiving means for receiving a plurality of items of variable print information and fixed print information used in common with said plurality of items of variable print information from a host system, each of said plurality of variable print information defining a character image to be printed and said fixed print information defining a form image to be printed combined with said character image; character image data generating means coupled to said receiving means and responsive to said variable print information supplied from said host system for generating character image data; form image data generating means coupled to said receiving means and responsive to said fixed print information supplied from said host system for generating form image data; image memory means for storing image data; writing means for writing said character image data output from said character image data generating means and said form image data output from said form image data generating means in a predetermined location of said image memory means to combine said character image data and said form image data on said image memory means; reading means for reading said image data from said image memory means; and printing means for printing said image data read from said image memory means; said writing means including OR writing means for obtaining and writing the logical sum of new image data to be written into and image data which has been written into a specific memory area of said image memory means and erase writing means for erasing image data which has been written into and writing new image data into said image memory means, said erase writing means being used for writing said character image data into said image memory means when printing is performed with said variable print information changed and said fixed print information unchanged, said reading means including erase reading means for erasing contents of a memory area of said image memory means from which image data is read and non-eras reading means for reading image data from said image memory means with the image data held in said image memory means, said non-erase reading means being used for reading the image data from said image memory means when printing is performed with said fixed print information unchanged and said variable print information changed, and said erase reading means being used for reading the image data from said image memory means to apply it to said printing means when printing is performed with said fixed print information changed.

According to another aspect of the present invention there is provided a method of synthesizing images and printing an image obtained by the synthesizing, comprising the steps of: preparing fixed form data; preparing first and second non-fixed form data, said first and second non-fixed form data using said fixed form data in common and an image defined by said fixed form data and an image defined by each of said first and second non-fixed form data being synthesized for printing; forming a first synthetic image by obtaining the substantial logical sum of the image defined by said fixed form data and the image defined by said first non-fixed form data; printing said first synthetic image; replacing that part of said first synthetic image which corresponds to said first non-fixed form data with the image defined by said second non-fixed form data, thereby erasing said first synthetic image and forming a second synthetic image; and printing said second synthetic image.

According to the printer and the printing method of the present invention, form data is developed only once for a plurality of non-form data sharing the form data. The form data is not erased until printing of the plurality of form data are printed out. Hence, the form data can be developed in a short time, thus achieving printing at a high speed. In addition, only one frame memory is needed to store an image.

BRIEF DESCRIPTION OF THE DRAWINGS

Further objects and advantages of the present invention will be apparent from the following description of the preferred embodiments with reference to the accompanying drawings, in which.

DETAILED DESCRIPTION OF THE PREFERRED EMBODIMENTS

One embodiment of the invention will be described with reference to FIGS. 1 to 7.

Figure 2:
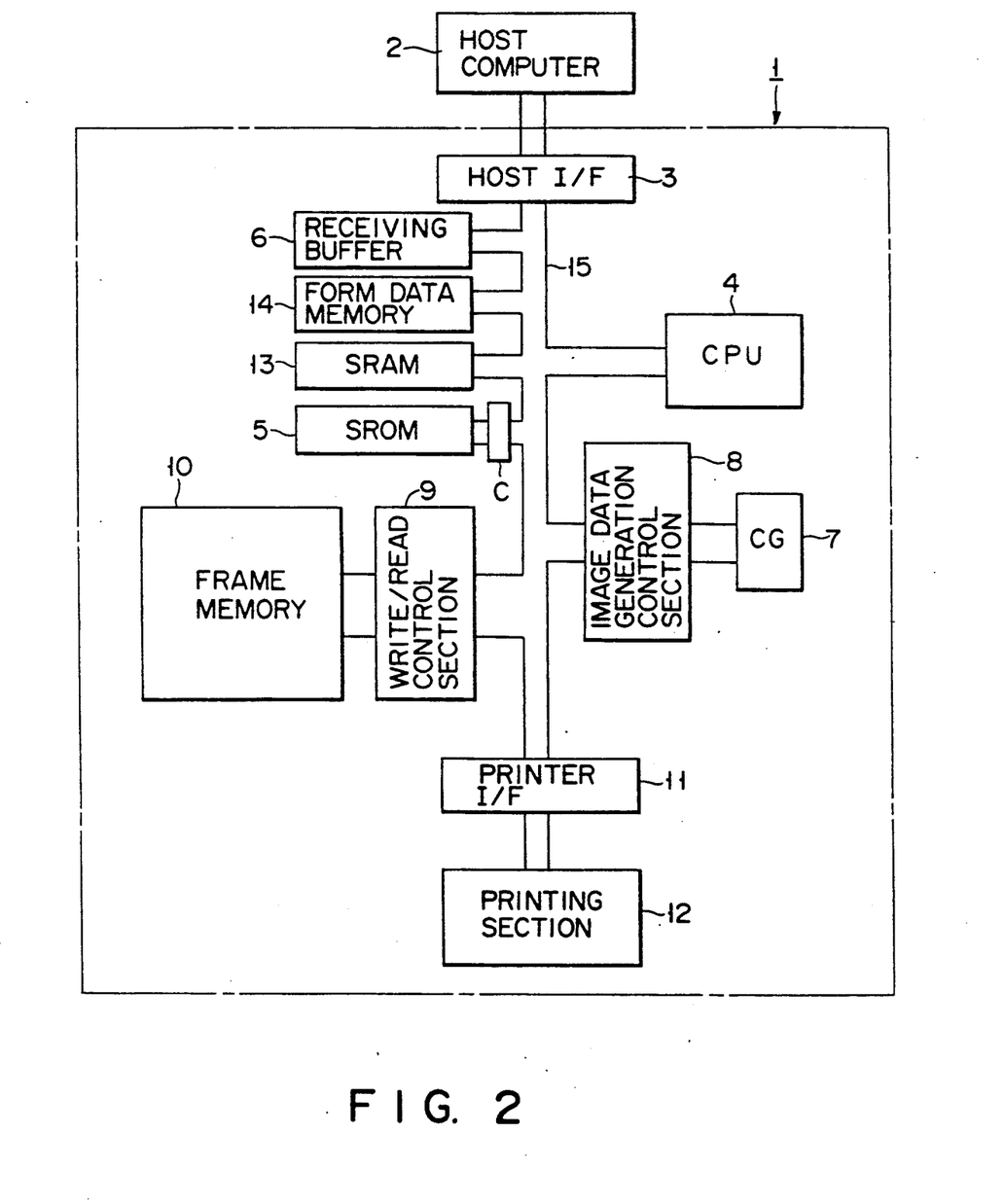
FIG. 2 is a block diagram of a printer according to the present invention to which a host computer is connected.

Referring now to FIG. 2, a host computer 2 is formed of a personal computer, an office computer or a word processor. Print information of form data (data for defining an image of a fixed form) and non-form data (data on numeric values, characters, symbols and so on) and control information are sent from host computer 2 to a CPU 4 of printer 1 via a host I/F (interface) 3 and a bus 15. Host I/F 3 is, for example, an interface conforming to specifications of *Centronics*. Host I/F 3 allows data transmission between host computer 2 and printer 1.

CPU 4 executes programs stored in a system ROM 5 for overall control of printer 1. More specifically, CPU 4 receives data and instructions supplied from host computer 2 via host I/F 3. Upon receipt of data and instructions, CPU 4 determines their contents and store them once in buffer memories. More specifically, when received data is form data, CPU 4 stores it in form data memory 14. When the received data is non-form data, CPU 4 stores it in receiving buffer 6. Furthermore, CPU 4 controls printing operations on the basis of data and instructions once stored in the buffer memory and so on. First, CPU 4 reads form data from form data memory 14. CPU 4 reads an image pattern corresponding to the read form data from character generator (CG) 7 through image data generation control section 8. CPU 4 develops or expands the read image data in frame memory 10 through a write/read control section 9. Next, CPU 4 reads non-form data from receiving buffer 6. CPU 4 reads an image pattern corresponding to the read non-form data from character generator 7 through image data generation control section 8. CPU 4 develops the read image pattern in frame memory 10 through write/read control section 9.

Frame memory 10 stores information to be printed for one page of print paper in the form of a bit map. Frame memory 10 may be formed of a dynamic RAM. The contents (bit map image) of frame memory 10 is transmitted to print a head in printing section 12 through write/read control section 9 and printer I/F section 11 in carrying out printing operation.

A stack area and a work area that CPU 4 uses for temporary storage of the result of an arithmetic operation are provided in system RAM 13. Form data memory 14 stores form data sent from host computer 2. One memory may be used in common for form data memory 14 and system RAM 13.

The printer of the embodiment has first and second print modes. In the first print mode, after the printing of a certain page is terminated, non-form data of the next page is written into frame memory 10 with the form image still stored therein. In the second print mode, on the other hand, after the printing of a certain page is terminated, the contents of frame memory 10 are cleared and the form data and non-form data of the next page are combined in frame memory 10 again. System ROM 5 stores a control program for the first print mode and a control program for the second print mode.

The printer operation in the first print mode will be described. To facilitate the understanding of the invention, the operation will be described taking a case where form data shown in FIG. 3A and non-form data shown in FIG. 3B are combined so as to print a list shown in FIG. 3C by way of example.

Figure 4:
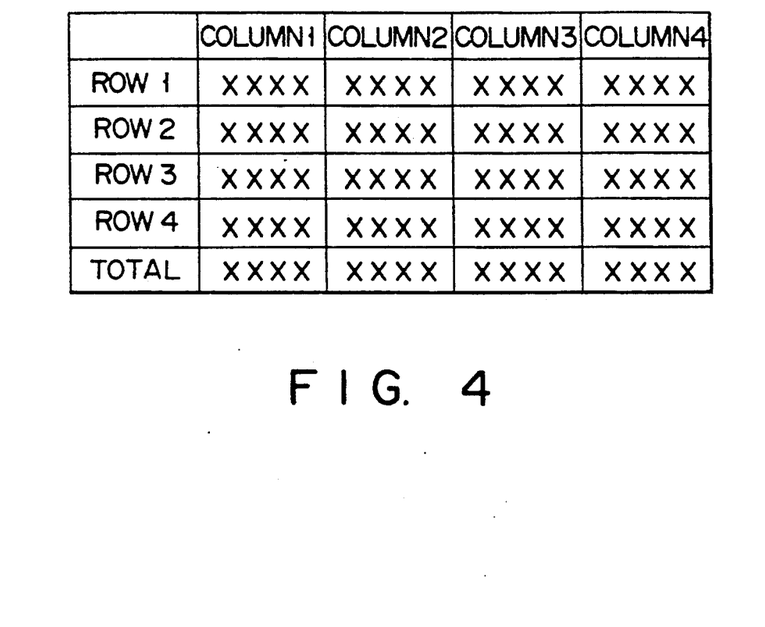
FIG. 4 shows positions in which non-form data are written.
Figure 5:
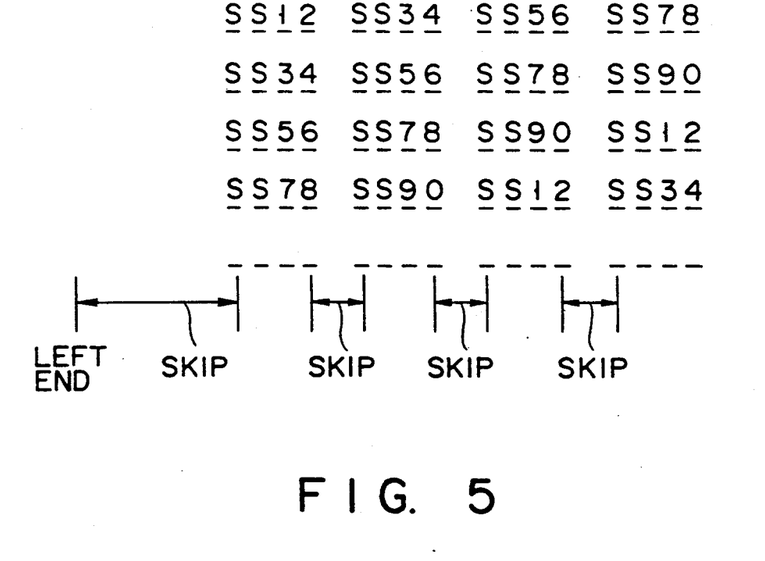
FIG. 5 shows the format of non-form data prepared by the host computer.

The non-form data are inserted in positions indicated by Xs in FIG. 4. To this end, host computer 2 prepares non-form data in such a form as shown in FIG. 5 using application software. In FIG. 5 symbols S indicate spaces. More specifically, the non-form data contains an instruction for adjusting pointers controlling positions in which characters are to be written so as not to write images in areas other than areas indicated by Xs in FIG. 4 along with character codes. For example, host computer 2 allows the non-form data to contain an skip instruction which adjusts a horizontal pointer so as not to print characters in the margin of paper, over the frame lines and so on. Where there is no digit or character to be printed in a position indicated by X in FIG. 4, a space image (blank image data for one character) is written in the position. To this end, host computer 2 transmits a space code to a space portion. Where host computer 2 transmits no space code for a space portion (for example, where host computer 2 instructs to print "23" at the left end of a block), CPU 4 itself generates space codes.

Figure 6:
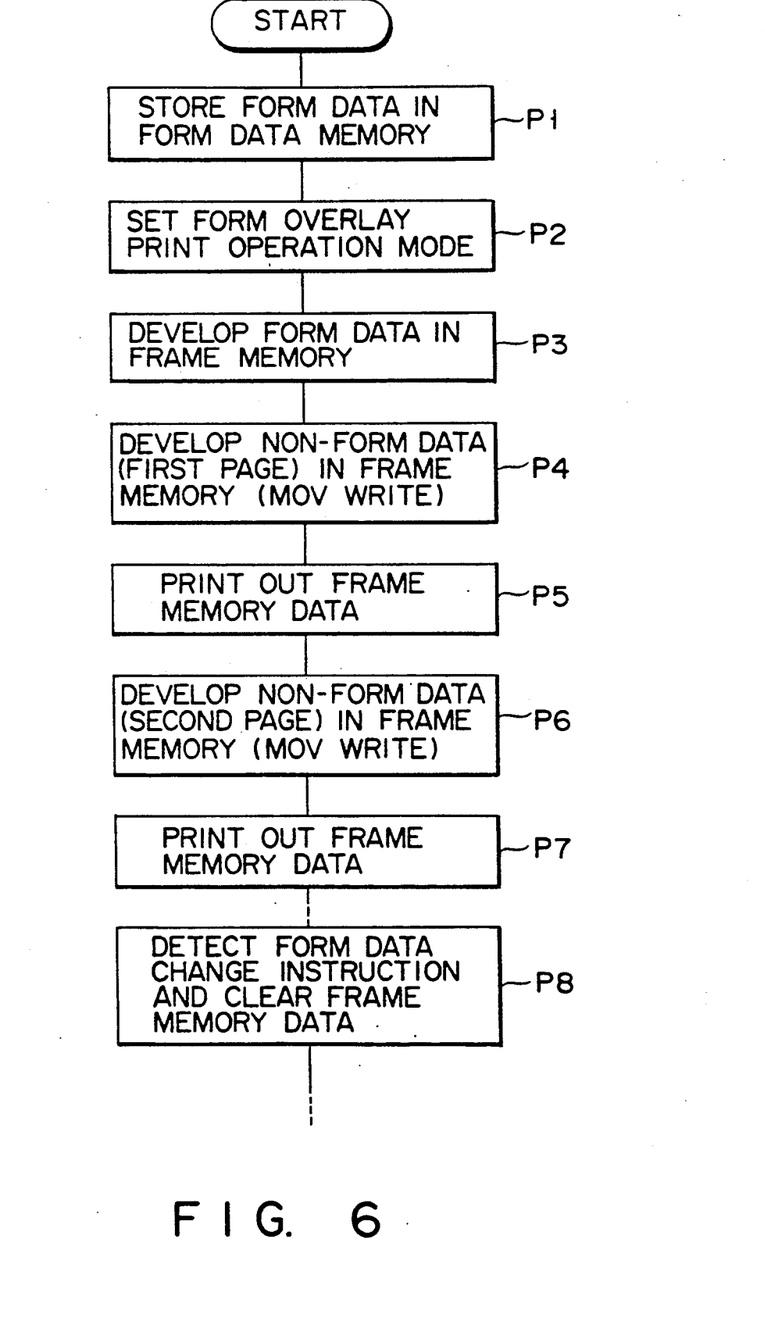
FIG. 6 is a flowchart of a first overlay process according to an embodiment of the present invention.

When the mode 1 is specified by host computer 2, CPU 4 reads a control program for the mode 1 from SROM 5 to execute the operation shown in FIG. 6.

The operation illustrated in FIG. 6 will be described taking a case where a series of data shown in FIG. 1 is supplied to printer 1 by way of example.

Figure 3A:
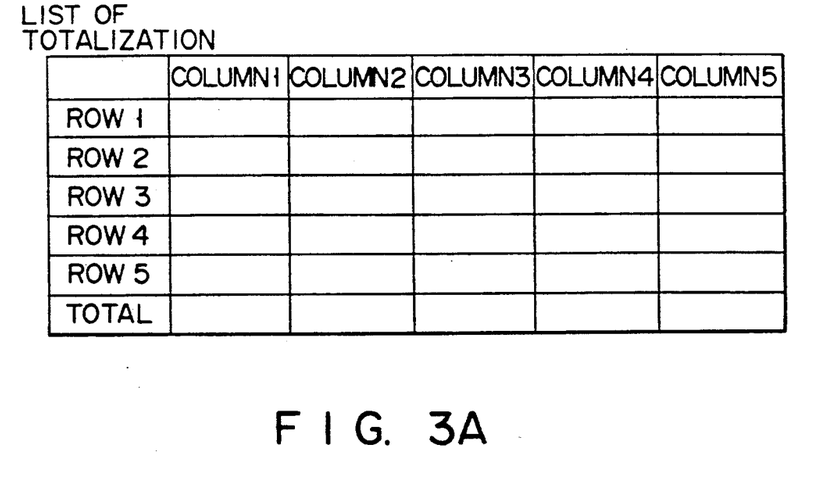
FIG. 3A illustrates an example of form data.
Figure 3B:
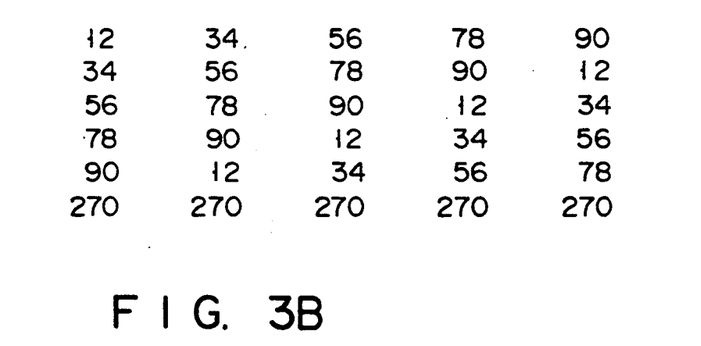
FIG. 3B illustrates an example of non-form data.
Figure 3C:
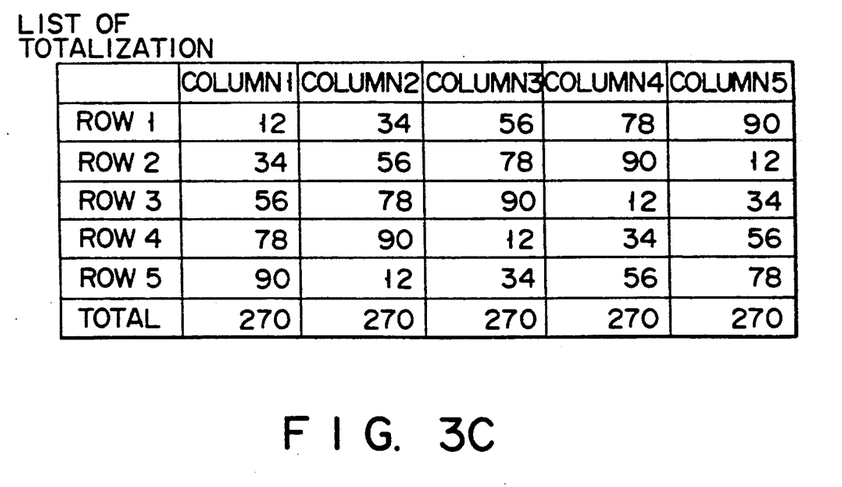
FIG. 3C illustrates a printed image resulting from an overlay process of the form data of FIG. 3A and the non-form data of FIG. 3B.
Figure 7:
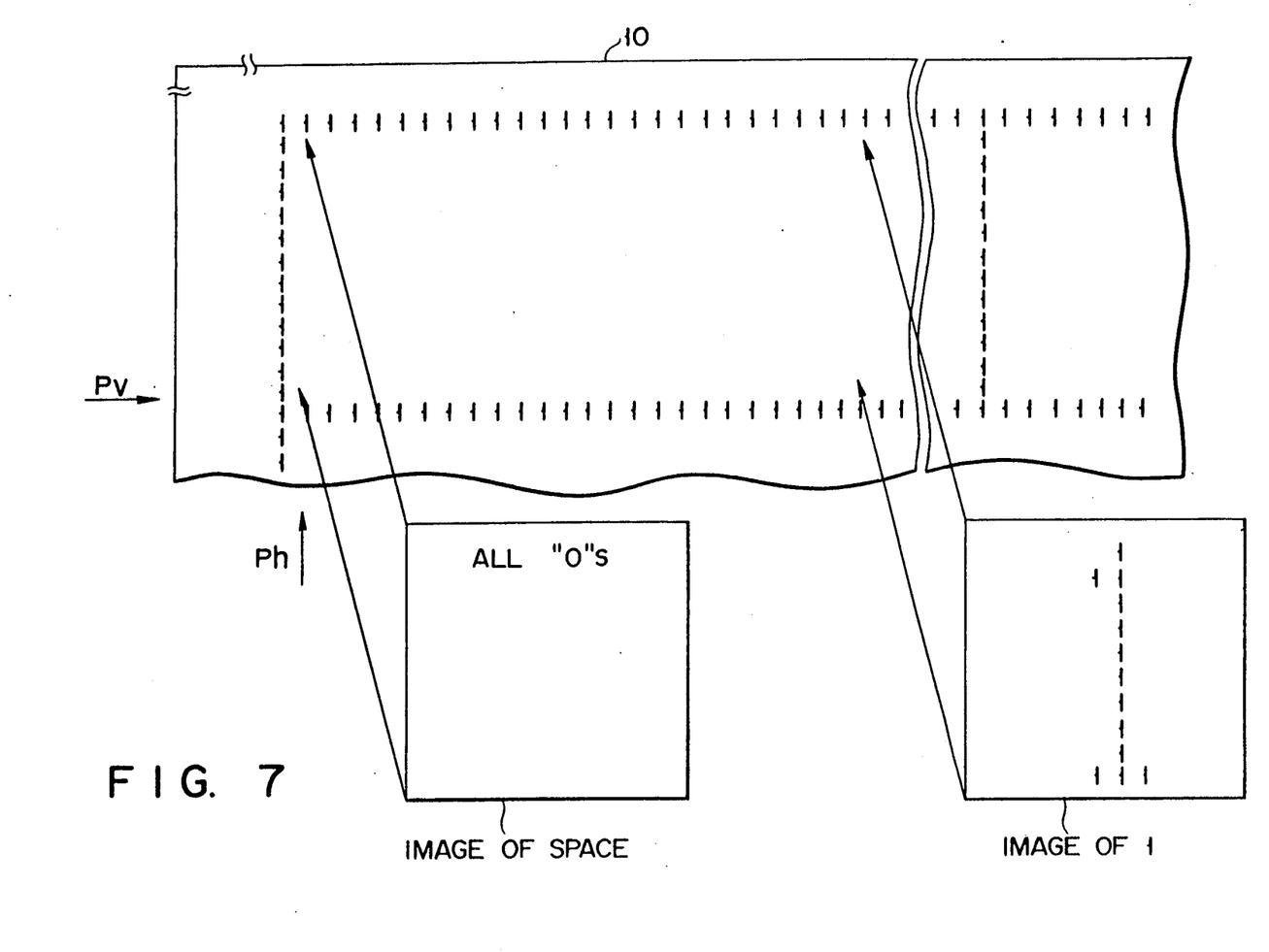
FIG. 7 is a diagram for illustrating the overlay process.
Figure 8:
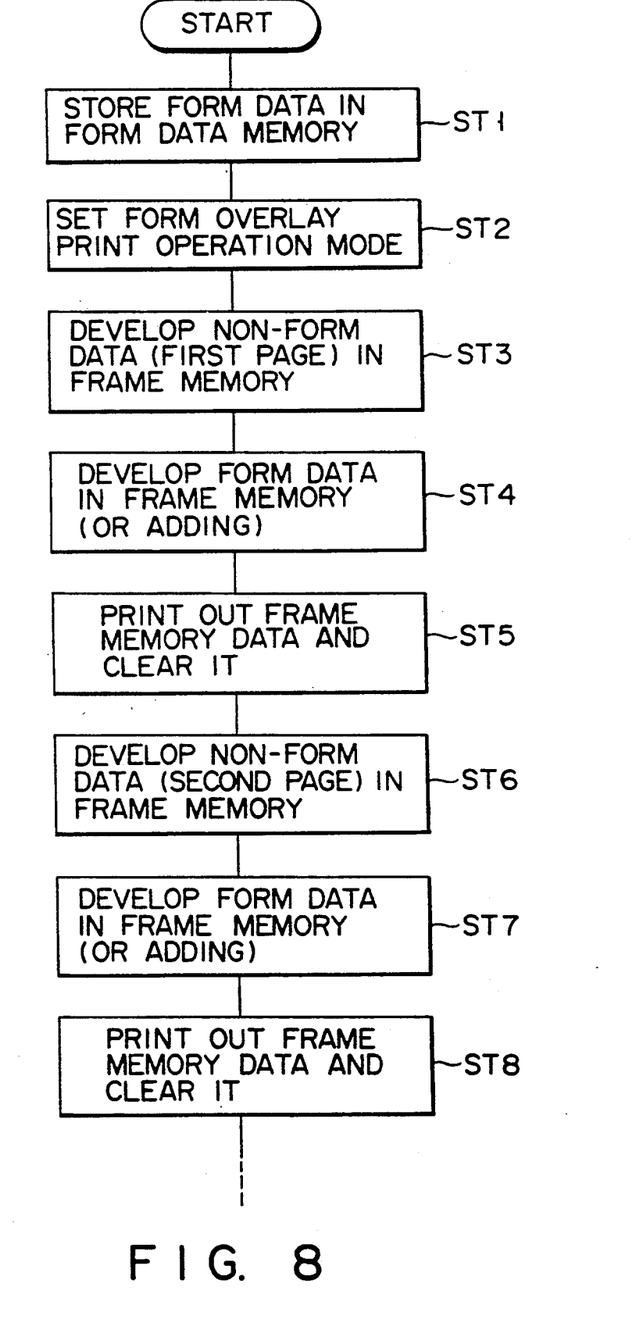
FIG. 8 is a flowchart of a second form overlay process according to a embodiment of the present invention.

Host computer 2 sends form data T1 shown in FIG. 3A to printer 1. Printer 1 writes the received form data into form data memory 14 (step P1). Host computer 2 feeds a form overlay print instruction T2 to printer 1. Responsive to form overlay print instruction T2 CPU 4 sets an identification flag for executing a form overlay print operation mode in system RAM 13 or performs processing for changing the flow so as to set the form overlay print operation mode (step P2). Afterwards CPU 4 reads image data corresponding to form data stored in form data memory 14 from character generator 7 or system ROM 5 through image data generation control section 8. CPU 4 develops the image of the read form data (bit map image) in frame memory 10 as shown in FIG. 7 (step P3), in which one character is formed of 12×12 dots and a bit of "1" indicates a black dot. Bits of 0s are not indicated for the purpose of simplifying illustration.

Host computer 2 supplies non-form data T3 of the first page, non-form data T4 of the second page and so on to printer 1. When printer 1 receives non-form data T3, CPU 4 stores the received non-form data in receiving buffer 6 temporarily. CPU 4 reads the non-form data from receiving buffer 6 again one character at a time. CPU 4 reads image data corresponding to the read character code from character generator 7 through image data generation control section 8. CPU 4 then writes the read image data into frame memory 10 (step P4). The writing of image data is carried out by write-/read control section 9 which responds to an MOV instruction from CPU 4. The MOV instruction is an instruction to direct data transfer between memories, by which the contents of a memory at data destination are rewritten with the contents of a memory at data source. This type of instruction is generally called the MOV instruction in the 8080 series CPU (with the Z80 series CPU, it is called LD instruction). In the following description, therefore, the rewrite instruction of CPU 4 is referred to as the MOV instruction, and the writing of image data generated by character generator 7 into frame memory 10 is called "MOV write".

The operation of developing non-form data in frame memory 10 will be described specifically. First, CPU 4 sets a vertical pointer Pv to the position of the first row in the vertical direction on the basis of, for example, a line feed instruction. Moreover, since there is a skip instruction at the head of the first row of the non-form data, CPU 4 sets a horizontal pointer Ph to the number of lines specified by the skip instruction.

Next, CPU 4 reads a bit map image of all "0s" corresponding to a space from character generator 7. CPU 4 drives write/read control section 9 to write the space image in an area of 12 bits×12 bits with origin at the position defined by the vertical pointer Pv and the horizontal pointer Ph as shown in FIG. 7. Upon the termination of the writing of the space image, CPU 4 adds the number of dots of one character (12 in the example of FIG. 7) to the horizontal pointer Ph. CPU 4 subsequently writes a space image in a 12 bits×12 bits area with origin at the position defined by the pointer Pv and the updated pointer Ph and then updates the horizontal pointer Ph. Also, CPU writes an image of "1" in an area with origin at the position defined by the pointer Pv and the updated pointer Ph as shown in FIG. 7. Subsequently CPU 4 expands an image of "2". There is a skip instruction following the character of "2" so that CPU 4 adds the specified number of dots to the horizontal pointer Ph in accordance with data representing an amount of skip.

Afterward, space, space, character 2, character 3 . . . are developed in frame memory 10. After characters for one row are developed, CPU 4 detects a return code. Responsive to the return code, CPU 4 adds a predetermined value, which is determined at the stage of setting a format and supplied from host computer 2, to the vertical pointer Pv and initializes the horizontal pointer Ph. In a case where a line feed instruction is supplied from the host computer as well, CPU 4 adds a specified value to the vertical pointer Pv. Afterward, CPU 4 sequentially develops a string of characters of the second row, a string of characters of the third row and so on in frame memory 10. In this way non-form data can be developed in frame memory 10 without damaging the previously developed form data.

After the developing of image data for one page has been completed, the image on frame memory 10 is printed out in step P5. The printed copy is discharged to an outlet tray. Where the host computer indicates that a plurality of copies are to be printed, CPU 4 prints a specified number of copies. In the first print mode, the contents of frame memory 10 are not cleared even when printing is completed.

Upon the termination of printing of non-form data for the first page, CPU 4 retains the above form data non-erased and develops only non-form data of the second page in frame memory 10. When the non-form data of the second page is not received yet, CPU 4 waits for the acceptance of the data.

The developing of the non-form data of the second page is carried out in the same manner as in the case of the non-form data of the first page. That is, CPU 4 sequentially reads non-form data from receiving buffer 6, reads corresponding image data from character generator 7 and writes them in the positions (positions indicated by Xs in FIG. 4) of frame memory 10 which are defined by pointers Pv and Ph.

By MOV writing the non-form data of the second page into frame memory 10 in this way, the image of the old non-form data is automatically erased so that it is replaced with the image of the new non-form data. Hence, the image of the old non-form data needs not to be erased positively.

When the developing of the non-form data of the second page is completed, the generated image is printed out (step P7). When receiving non-form data (T4, T5 . . . ) of the third page and following pages, CPU 4 carries out the same process a in steps P6 and P7.

When the processes for a group of non-form data common to the form data are completed, host computer 2 issues a form data change instruction T6 as shown in FIG. 1. Responsive to the form data change instruction T6, CPU 4 controls read/write control section 9 to clear the contents of frame memory (step P8).

The second print mode according to the embodiment will be described next.

Responsive to an instruction from host computer 2 CPU 4 reads the program for the second print mode from system ROM 5 and operates in accordance therewith.

The operation of CPU 4 in the second print mode will be described taking a case where data shown in FIG. 1 are supplied from host computer 2 to printer 1 by way of example.

CPU 4 stores form data supplied first in form data memory 14 (step ST1). Next CPU 4 receives a form overlay print instruction T2 to set a form overlay print mode (step ST2). When receiving non-form data (T3, T4 . . . ), CPU 4 stores them in receiving buffer 6 temporarily.

Next CPU 4 reads non-form data of the first page from receiving buffer 6. CPU 4 spreads the read non-form data of the first page in the same manner as in the case of non-form data in the first print mode (step ST3). When the developing of the non-form data for one page is completed, CPU 4 reads form data from form data memory 6 and develops it in frame memory 10 (step ST4). The developing process is carried out by ORing (adding) process in order to overlay the image of the previously spread non-form data and the image of the form data. By the above process a synthetic or combined image of the form data image and the non-form data image is completed in frame memory 10. Afterward the synthetic image is printed out. The image data in frame memory 10 is cleared (erased) when printing is terminated (step ST5).

Afterward, CPU 4 develops non-form data of the second page in frame memory 10 (step ST6). Upon the completion of the developing, CPU 4 reads a form data image and ORs the read form data image with the non-form data image so that a synthetic image is developed in frame memory 10 (step ST7). Upon completion in frame memory 10 the synthetic image is printed out. Subsequently the contents of frame memory 10 are cleared (step ST8). The processes of steps ST3 and ST4 are then performed on non-form data of the third and fourth pages.

In the description of the operation in the first print mode the combination of the non-form data of the first page and the form data substantially corresponds to obtaining the logical sum of both data. Therefore, the combination of the non-form data of the first page and the form data in the first mode may take any form provided that the logical sum of both data is obtained and it is stored in frame memory 10. For example, the logical sum of data read from frame memory 10 and data generated by character generator 7 might be returned to frame memory 10.

In the description of the second mode, the non-form data is developed in frame memory 10 prior to the form data. Alternatively the form data may be developed prior to the non-form data.

In the above embodiment, switching is made between the first and second print modes by an instruction from host computer 2. Alternatively, the switching may be made by the use of a switch not shown. The system ROM 5 may store only a program for performing the operation of the first or second mode. In this case, the host computer 2 does not need to output the mode switching instruction. Also, system ROM 5 may be formed of, for example, a ROM card which is connected to bus 15 via connector C so that replacement of the ROM card with another ROM card can effect switching between the first and second print modes.

In the above embodiment, the form data represents a frame forming a list. In the present invention, the form data does not need to be limited to frames and any image common to a plurality of pages may be used as form data. For example, a background picture common to a plurality of pages or a peripheral decoration of paper common to a plurality of pages may be used as form data.

In the first mode of the embodiment, after being developed in frame memory 10, form data is not cleared and non-form data is only rewritten unless a form change instruction is issued. As compared with the prior art, therefore, the data developing speed and printing speed are improved. Also, the memory capacity may be less than the prior art. In the second mode as well, form data and non-form data are directly developed in the frame memory thus permitting higher speed printing and less memory capacity.

It is to be understood that the present invention is not limited to the above embodiment and many variations and modifications of the invention are possible. Accordingly, all such variations and modifications are to be included within the scope of the appended claims.

What is claimed is:

1. A printer comprising:

receiving means for receiving a plurality of items of variable print information and fixed print information used in common with said plurality of items of variable print information from a host system, each of said plurality of variable print information defining a character image to be printed and said fixed print information defining a form image to be printed combined with said character image;

character image data generating means coupled to said receiving means and responsive to said variable print information supplied from said host system for generating character image data comprising dot patterns;

form image data generating means coupled to said receiving means and responsive to said fixed print information supplied from said host system for generating form image data comprising dot patterns;

image memory means for storing image data in one memory for at least one page, said image data being an intermixed combination of the character image data and the form image data and comprising dot patterns;

writing means for writing said character image data output from said character image data generating means and said form image data output from said form image data generating means in a predetermined location of said image memory means to combine said character image data and said form image data in said image memory means;

reading means for reading said image data from said image memory means; and printing means for printing said image data read from said image memory means;

said writing means including OR writing means for obtaining and writing the logical sum of new image data to be written into a specific memory area of said image memory means and image data which has been written in the specific memory area into the specific memory area, and erase writing means for erasing imagine data which has been written into and writing new image data into said image memory means, said erase writing means being used for writing said character image data into said image memory means when printing is performed with said variable print information changed and said fixed print information unchanged;

said reading means including erase reading means for erasing contents of a memory area of said image memory means from which image data is read and non-erase reading means for reading image data from said image memory means with the image data held in said image memory means, said non-erase reading means being used for reading the image data from said image memory means when printing is performed with said fixed print information unchanged and said variable print information changed, and said erase reading means being used for reading the image data from said image memory means to apply it to said printing means when printing is performed with said variable print information changed.

2. A printer according to claim 1, in which said OR writing means and said erase writing means are selectively operated in response to information from said host system, and said erase reading means and said non-erase reading means are selectively operated in response to information from said host system.

3. A printer according to claim 1, in which said OR writing means writes the character image data into said image memory means after the form image data has been written into said image memory means, and said erase writing means rewrites character image data with new character image data with form image data held in said image memory means.

4. A printer according to claim 1, in which said reading means has a copy print operation mode in which a piece of image data is repeatedly read from said image memory means plural times for transmission to said printing means, and said non-erase reading means reads image data from said image memory means for transmission to said printing means during the copy print operation mode.

5. A printer according to claim 1, in which said fixed print information contains data defining an image of a frame, and said variable print information contains data defining an image of at least one of characters, a graphic and a symbol to be arranged within the frame.

6. A printer according to claim 1, in which said image memory means comprises a dynamic RAM.

7. A printer according to claim 6, in which said erase writing means includes means for transferring data to a predetermined area of said dynamic RAM, and said OR writing means includes means for obtaining the logical sum of data stored in an area of said dynamic RAM where new image data is to be written into and new image data and writes the resultant image data into said area of said dynamic RAM.

8. A printer according to claim 1, wherein said OR writing means includes: a first addressing means for addressing an area of said image memory means in which the character data is stored in order to write new character image data on prestored character image data, and avoiding addressing an area of said image memory means in which the form image data is stored in order to maintain prestored form image data; and means for writing the character image data to the area which said addressing means addresses, and said erase writing means includes: an addressing means for addressing areas of said image memory means in which the character image data and the form image data are stored in order to update both the character image data and the form image data; and means for writing the character image data and the form image data to the area which said addressing means addresses.

9. A printer according to claim 1, wherein said character image data generating means includes means for generating dot pattern data corresponding to said variable print information, and said form image data generating means includes means for generating dot pattern data corresponding to said fixed print information.

10. A printer according to claim 1, wherein said writing means writes said character image data and said form image data to said image memory means directly and combines them directly without separately developing the character image data of one page and the form image data of one page on different memories at once, and without combining the developed character image data of one page and the developed form image data of one page.

* * * * *